(12) United States Patent
Rembisz et al.

(10) Patent No.: US 10,011,016 B1
(45) Date of Patent: Jul. 3, 2018

(54) SURFACE MARKERS AND METHODS FOR USE

(71) Applicant: X Development LLC, Mountain View, CA (US)

(72) Inventors: Justine Rembisz, Mountain View, CA (US); Miguel Rivas, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 142 days.

(21) Appl. No.: 15/151,852

(22) Filed: May 11, 2016

(51) Int. Cl.
*B25J 11/00* (2006.01)
*G05D 1/02* (2006.01)

(52) U.S. Cl.
CPC ........ *B25J 11/0085* (2013.01); *G05D 1/0214* (2013.01); *G05D 1/0255* (2013.01); *G05D 2201/0203* (2013.01)

(58) Field of Classification Search
None
See application file for complete search history.

(56) References Cited

U.S. PATENT DOCUMENTS

| | | | |
|---|---|---|---|
| 7,557,703 B2 | 7/2009 | Yamada et al. | |
| 7,769,203 B2 | 8/2010 | Oohashi et al. | |
| 9,026,301 B2 | 5/2015 | Zini et al. | |
| 9,427,874 B1* | 8/2016 | Rublee | B25J 9/1697 |
| 2007/0061041 A1 | 3/2007 | Zweig | |
| 2011/0202175 A1 | 8/2011 | Romanov | |
| 2012/0173050 A1* | 7/2012 | Bernstein | A63H 30/04 |
| | | | 701/2 |
| 2015/0205297 A1 | 7/2015 | Stevens et al. | |
| 2016/0100521 A1* | 4/2016 | Halloran | A01D 34/008 |
| | | | 180/169 |
| 2016/0297072 A1* | 10/2016 | Williams | G05D 1/0274 |
| 2016/0298970 A1* | 10/2016 | Lindhe | G05D 1/0248 |
| 2016/0327383 A1* | 11/2016 | Becker | G01B 11/005 |
| 2017/0113591 A1* | 4/2017 | Spielman, Jr. | E02F 1/00 |

\* cited by examiner

*Primary Examiner* — James M McPherson
(74) *Attorney, Agent, or Firm* — McDonnell Boehnen Hulbert & Berghoff LLP

(57) ABSTRACT

An example implementation includes operating a robotic system in an environment. The implementation also includes detecting, using one or more sensors of the robotic system, a surface marker at a first location in the environment. The implementation also includes determining that the detected surface marker indicates the presence of an object having a first surface attribute at the first location, wherein the first surface attribute is one of a plurality of predefined surface attributes. The implementation also includes determining one or more tasks that correspond to the first surface attribute in response to determining that the surface marker indicates the object having the first surface attribute. The implementation also includes causing the robotic system to perform the one or more tasks with respect to the object.

20 Claims, 4 Drawing Sheets

SURFACE MARKERS AND METHODS FOR USE

BACKGROUND

As technology advances, various types of robotic systems are being created for performing a variety of functions that may assist users. Robotic systems may be used for applications involving material handling, transportation, cleaning, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient and safe robotic systems has helped open up a field of innovation in actuators, movement, sensing techniques, as well as component design and assembly.

SUMMARY

The present disclosure generally relates to robotic systems that may be utilized in various applications such as cleaning, organization, or various other tasks in a household, office, or indoor public space environment. Such a robotic system may include various components such as sensors, cameras, manipulators, and/or robotic arms. Additionally, the robotic system may be remotely or autonomously operated to perform various tasks. To help guide and instruct such a robotic system, a plurality of surface markers may be positioned on a plurality of objects in the environment of the robotic system. The robotic system may include one or more sensors that are capable of detecting the plurality of surface markers, and the surface markers may indicate the presence of a surface attribute of a given object. The robotic system may subsequently perform one or more tasks with respect to the object based on the determined surface attribute.

A first example implementation includes (i) operating a robotic system in an environment, (ii) detecting, using one or more sensors of the robotic system, a surface marker at a first location in the environment, (iii) determining that the detected surface marker indicates the presence of an object having a first surface attribute at the first location, wherein the first surface attribute is one of a plurality of predefined surface attributes, (iv) in response to determining that the surface marker indicates the object having the first surface attribute, determining one or more tasks that correspond to the first surface attribute, and (v) causing the robotic system to perform the one or more tasks with respect to the object.

A second example implementation includes a robotic system having (i) one or more processors; (ii) one or more sensors; and (iii) data storage including program instructions stored thereon that when executed by the one or more processors of the robotic system while operating in an environment, cause the robotic system to perform operations. The operations include (i) detecting, using the one or more sensors, a surface marker at a first location in the environment, (ii) determining that the detected surface marker indicates the presence of an object having a first surface attribute at the first location, wherein the first surface attribute is one of a plurality of predefined surface attributes, (iii) in response to determining that the surface marker indicates the object having the first surface attribute, determining one or more tasks that correspond to the first surface attribute, and (iv) performing the one or more tasks with respect to the object.

A third example implementation includes a non-transitory computer-readable storage medium having stored thereon instructions, that when executed by one or more processors, cause a robotic system to carry out operations. The operations include (i) operating a robotic system in an environment, (ii) detecting, using one or more sensors of the robotic system, a surface marker at a first location in the environment, (iii) determining that the detected surface marker indicates the presence of an object having a first surface attribute at the first location, wherein the first surface attribute is one of a plurality of predefined surface attributes, (iv) in response to determining that the surface marker indicates the object having the first surface attribute, determining one or more tasks that correspond to the first surface attribute, and (v) causing the robotic system to perform the one or more tasks with respect to the object.

A fourth example implementation may include a system having means for performing operations in accordance with the first example implementation.

These as well as other aspects, advantages, and alternatives will become apparent to those of ordinary skill in the art by reading the following detailed description, with reference where appropriate to the accompanying drawings.

DETAILED DESCRIPTION

Figure 1:
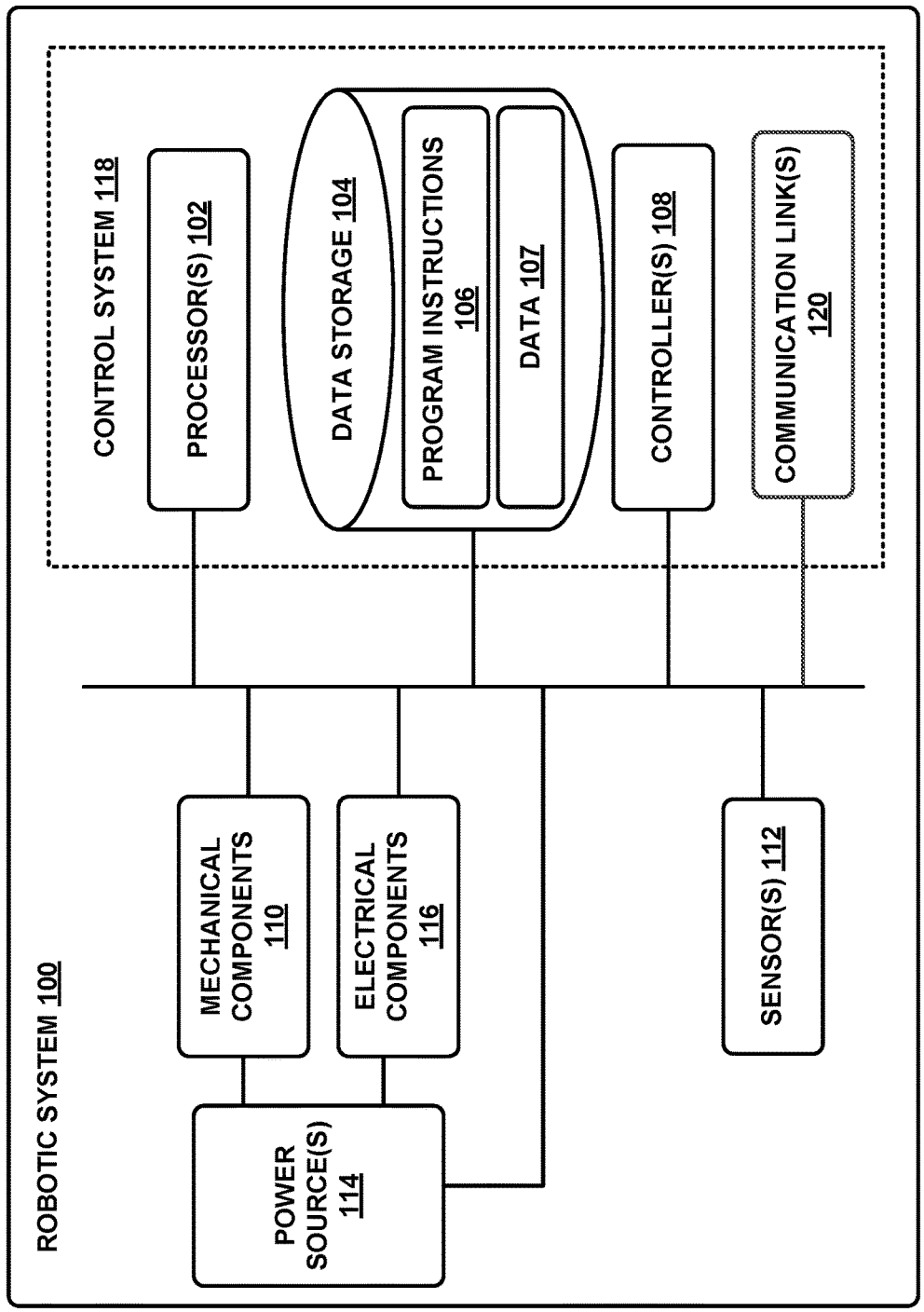
FIG. 1 illustrates a configuration of a robotic system, according to an example implementation.

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Robotic systems may be utilized in various applications such as cleaning, organization, or various other tasks in a household, office, or indoor public space environment. Such a robotic system may include various components such as sensors, cameras, manipulators, and/or robotic arms. Additionally, the robotic system may be remotely or autonomously operated to perform various tasks.

To help guide and instruct such a robotic system, a plurality of surface markers may be positioned on a plurality of objects in the environment of the robotic system. The plurality of surface markers may include infrared (IR) reflective stickers, radio frequency identification (RFID) tags, IR light-emitting diodes (LEDs), matrix barcodes, a chemical spray, magnets, or speakers that emit a sound outside of the human hearing range, as examples. In one example, the plurality of surface markers may be invisible to the human eye.

The robotic system may include one or more sensors that are capable of detecting the plurality of surface markers, and the surface markers may indicate the presence of a surface attribute of a given object. The robotic system may subsequently perform one or more tasks with respect to the object based on the determined surface attribute. The implementation of these surface markers would provide instructions to the robotic system such as which areas of the environment to clean, a specific order in which the robotic system should clean the environment, which objects the robotic system should not touch, which doors the robotic system can go through, and which doors the robotic system should not go through, as examples.

The surface markers may be detected by the one or more sensors of the robotic system from a distance, and therefore may be a way to assist in navigation of the robotic system in the environment while using minimal computational power. In addition to assisting with navigation of the robotic system, the surface markers may be used to instruct the robotic system to perform one or more tasks with respect to the object on which the surface marker is placed. In another example, the surface markers may be used for manipulation of the object on which the surface marker is placed.

As a particular example, the environment in which the robotic system operates may include a kitchen, and a user may place a surface marker on glass doors, wood cabinet doors, ceramic floor tiles, granite countertops, and stainless steel appliances in the kitchen. An example robotic system may include wheels, an arm, and a storage bin including a plurality of cleaning supplies. The robotic system will go through the kitchen and detect each of the plurality of surface markers and clean each different type of surface accordingly. For example, the robotic system may clean the glass doors using a mixture of vinegar and water with a microfiber cloth. Further, the robotic system may clean the ceramic floor tiles using a mild detergent and a rag. Further, the robotic system may clean the granite countertops using dishwasher detergent and water using a microfiber cloth. Further still, the robotic system may clean the stainless steel appliances using a stainless steel cleaning solution and a towel.

It is noted that the scenarios and examples above are for illustrative purposes only. Other scenarios, examples, and configurations are possible as well and are described in greater detail within exemplary implementations herein. Additionally, many parameters of the implementations herein may be varied according to various applications. For example, methods herein may be implemented by various devices having various numbers, arrangements, and/or combinations of components.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic system, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, electrical components 116, and communication link(s) 120. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, electrical components 116, and/or communication links 120.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, the communication link(s) 120, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user.

The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

In some implementations, the control system 118 of robotic system 100 may also include communication link(s) 120 configured to send and/or receive information. The communication link(s) 120 may transmit data indicating the state of the various components of the robotic system 100. For example, information read by sensor(s) 112 may be transmitted via the communication link(s) 120 to a separate device. Other diagnostic information indicating the integrity or health of the power source(s) 114, mechanical components 110, electrical components 116, processor(s) 102, data storage 104, and/or controller 108 may be transmitted via the communication link(s) 120 to an external communication device.

In some implementations, the robotic system 100 may receive information at the communication link(s) 120 that is then processed by the processor(s) 102. The received information may indicate data that is accessible by the processor(s) 102 during execution of the program instructions 106. Further, the received information may change aspects of the controller(s) 108 that may affect the behavior of the mechanical components 114 or the electrical components 116. In some cases, the received information may indicate a query requesting a particular piece of information (e.g. the operational state of one or more of the components of the robotic system 100). The processor(s) 102 may subsequently transmit the particular piece of information back out the communication link(s) 120.

In some cases, the communication link(s) 120 may include a wired connection. The robotic system 100 may include one or more ports to interface the communication link(s) 120 to an external device. The communication link(s) 120 may include, in addition to or alternatively to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular set of one or more tasks. The input to control system 118 may be received via the communication link(s) 120. Based on this input, the control system 118 may perform operations to cause the robotic system 100 to perform the one or more tasks.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely. Communication link(s) 120 may be used at least in part to carry out the remote communication.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

As yet another example, the sensor(s) 112 may be used to detect a plurality of surface markers positioned on a plurality of objects in the environment of the robotic system 100. The surface markers may indicate the presence of a surface attribute of a given object of the plurality of objects. The robotic system 100 may then perform one or more tasks with respect to the object based on the determined surface attribute, as discussed in more detail below.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible.

An example robotic system capable of locating, manipulating, moving, and/or otherwise operating on objects is described herein. The robotic system may be used, for example, as a household help robot to carry out various tasks around a person's home (e.g., house, apartment, condominium, or any other type of residence). In some example implementations, the robotic system may be programmed to clean various surfaces of objects in the house and/or organize and return various household items to their respective storage places. In comparison to complex industrial robots, the example robotic system described herein may be constructed with a reduced number of degrees of freedom in order to reduce the cost of manufacturing and programming the robotic system.

Figure 2:
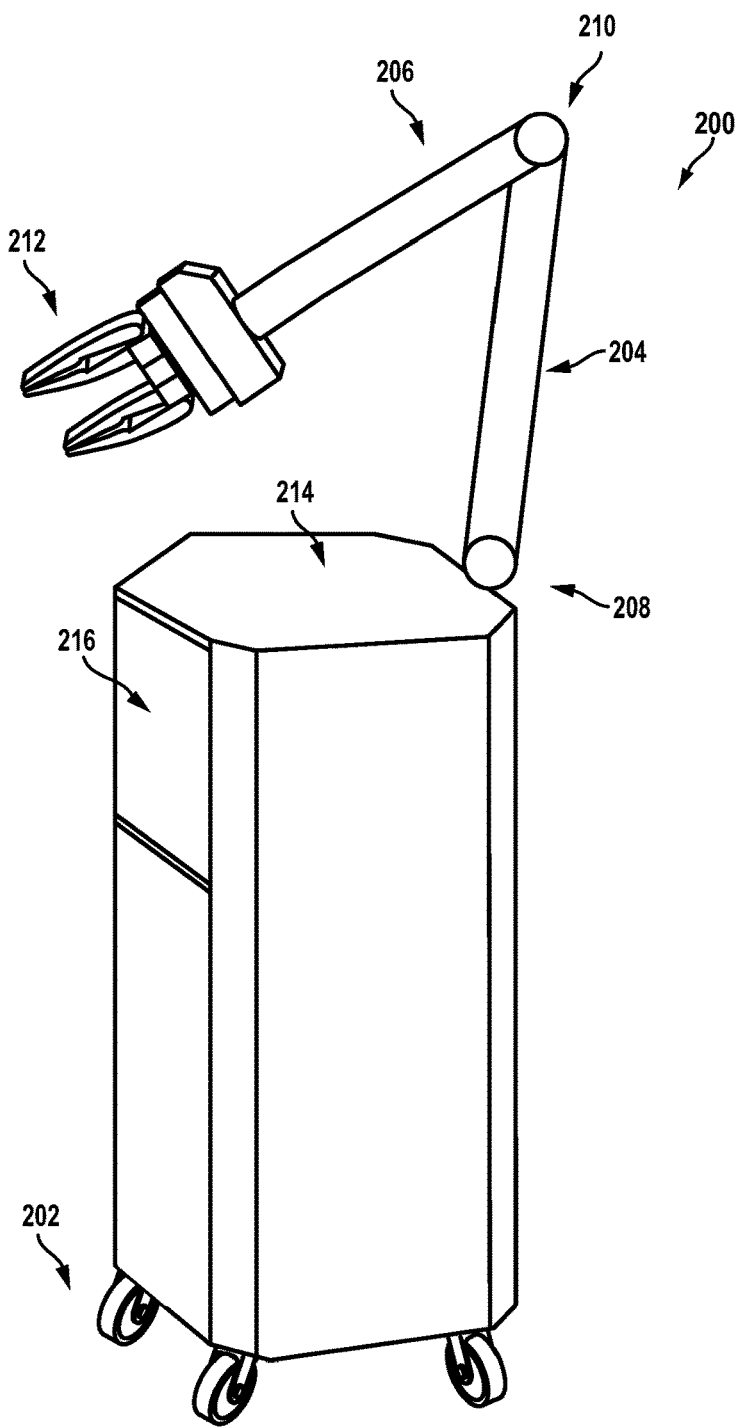
FIG. 2 illustrates a robotic system, according to an example implementation.

FIG. 2 illustrates an example robotic system 200. Robotic system 200 may be used to carry out the operations described herein. The robotic system 200 may correspond to the robotic system 100 shown in FIG. 1, and may be configured to perform some of the implementations described herein. Thus, the robotic system 200 may include one or more of mechanical components 110, sensor(s) 112, power source(s) 114, electrical components 116, and/or control system 118.

A robotic arm of robotic system 200 may be mounted on or connected to a base 202. The base 202 may be a mobile base configured to move about an environment using different means of movement including, for example, wheels, tracks, legs, and/or any combinations or variations thereof. The robotic arm may include a control arm comprising first linkage 204 and second linkage 206 connected to robotic system 200. A first end of the first linkage 204 may be connected to the robotic system 200 through rotational joint 208. A first end of the second linkage 206 may be connected to a second end of the first linkage 204 through rotational joint 210. Rotational joint 208 may be actuated to control a pitch of the first linkage 204 as well as the pitch of the control arm (first linkage 204 and second linkage 206) as a whole. Rotational joint 210 may be actuated to control a pitch of the second linkage 206. The rotational joints 208 and 210 may be purely rotational joints configured to rotate the first linkage 204 and the second linkage 206, respectively, in or parallel to a single plane of rotation. The control arm may also be referred to as an actuated control arm when it is actuated and/or configured to be actuated by at least one joint.

The robotic arm may additionally include an end effector 212. The end effector 212 may be at least one of a plurality of available end effectors including pinch grippers, suction grippers, forks/pitchforks, fork/pitchfork-like end effectors, shovels, shovel-like end effectors, excavator buckets, sweeping tools, pans, polishing tools, cleaning tools, and a tablet computer. The end effector 212 may be modular, allowing different types of end effectors to be attached depending on the particular task performed by the robotic system 212. FIG. 2 illustrates the end effector 212 comprising a gripper. In other implementations, the end effector 212 may comprise more than two different end effectors, each useful for a particular task that the robotic system is expected to perform.

As illustrated in FIG. 2, the base 202 may be a mobile base configured to move about an environment. The mobile base 202 may be configured to move using at least one of a plurality of different means of movement including, for example, wheels (as shown in FIG. 2), tracks, legs, and/or any combinations or variations thereof. The means of movement of mobile base 202 may be chosen based on an expected operating environment of robotic system 200. For example, when working inside a house with level floors and no large obstacles, robotic system 200 may utilize a wheeled base to move about. When the robot works outside, for example, to remove sticks, stones, or other debris from a front yard and/or a back yard of a house, the robot may utilize tracks or legs (e.g., a quadrupedal, hexapedal, or octopedal base). In some implementations, the mobile base 202 may be outfitted with a specialized mechanism and/or arrangement of legs that allows the robotic system 200 to climb up and down stairs.

The mobile base 202 may be modularized to allow the means of movement of the mobile base 202 to be adapted to the terrain the robot encounters or the environment the robot is expected to work in. In some example implementations, the mobile base 202 may be designed to swap between wheels, tracks, legs, and/or other specialized locomotive mechanisms. The process of swapping the means of movement of a mobile base may be carried out by a docking station configured to detach a first (presently attached means) of movement (e.g., wheels) and attach a second means of movement (e.g., caterpillar tracks). In other example implementations, the robotic system 200 may be designed to swap between different mobile bases having different means of movement. The process of swapping between different mobile bases having different means of movement may be accomplished by a docking station configured to detach the robotic system 200 from a first base having a first means of movement (e.g., wheels) and attach a second mobile base having a second means of movement (e.g., caterpillar tracks).

In example implementations, the support base 202 may be another robotic system such as bipedal or quadrupedal robotic system. For example, the robotic system 200 may be attached on top of a quadrupedal robot designed to carry loads. The robotic system 200 may be utilized to load and unload objects onto the quadrupedal robot. In other example implementations, the base 202 may be a fixed/stationary anchor/attachment point. Robotic system 200 may be confined to operate in a particular radius of the fixed anchor point. For example, robotic system 200 may operate in a shipping warehouse to pick up, move, and/or sort packages.

Further, the robotic system 200 may include a storage bin 214 positioned on the mobile base 202. The storage bin 214 may include an opening 216 into which the end effector 212 can place objects. For example, the robotic system 200 may pick up a variety of objects and place them in the storage bin 214 through the opening 216 to clean up an area of the residence of the user. In another example, the storage bin 214 may house a plurality of cleaning supplies. In such an example, the robotic system 200 may select and responsively remove a given cleaning supply through the opening 216 of the storage bin 214 based on the particular surface the robotic system 200 is to clean.

III. EXAMPLE IMPLEMENTATIONS

Example implementations are discussed below for guiding and instructing a robotic system in an environment. In particular, a plurality of surface markers may be positioned on a plurality of objects in the environment. The robotic system may include one or more sensors that are capable of detecting the plurality of surface markers, and the surface markers may indicate the presence of a surface attribute of a given object. The robotic system may subsequently perform one or more tasks with respect to the object based on the determined surface attribute.

Further, the term "object" as used herein is meant to encompass any possible object that the robotic system may encounter, and is not meant to be limiting. For instance, the object may be moveable or stationary, and may include surfaces on which the robotic system may operation, such as stairs, floors, carpet, and the like. Numerous other examples exist.

Figure 3:
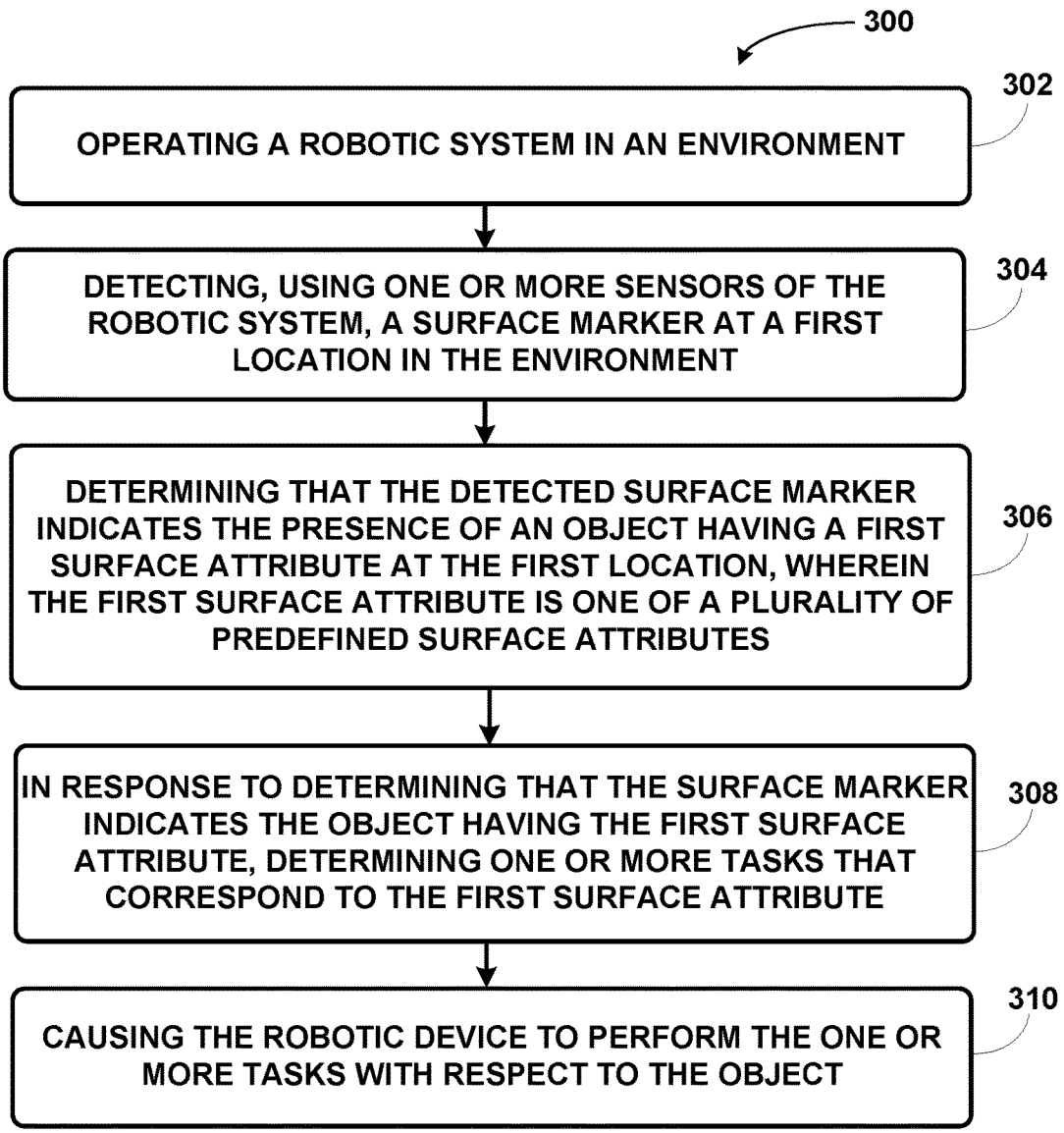
FIG. 3 is a flowchart of an example method, according to an example implementation.

FIG. 3 is a flowchart of a method 300, according to example implementations. The implementations may be carried out by one or more of the robotic systems as described above in relation to FIGS. 1-2. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other procedures and operations disclosed herein, the block diagram illustrates a possible implementation. In this regard, each block may represent a module, a segment, or a portion of program code, which includes one or more instructions executable by a processor or computing device for implementing specific logical operations. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, each block in FIG. 3 may represent circuitry that is wired to perform the specific logical operations.

At block 302, the method 300 includes operating a robotic system in an environment. The robotic system may be one or more of the robotic systems as described above in relation to FIGS. 1-2. The environment in which the robotic system operates may take a variety of forms. In one implementation, the environment may be a residential environment, such as a home, an apartment, or a condominium. In another implementation, the environment may be a commercial environment, such as a hotel, or an office building. Other environments are possible as well.

At block 304, the method 300 includes detecting, using one or more sensors of the robotic system, a surface marker at a first location in the environment. The one or more sensors may be any of the sensors discussed in the context of sensor(s) 112 of robotic system 100, for example. As such, the one or more sensors may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, chemical sensors, and/or cameras, among other possibilities. In one implementation, the robotic system uses its one or more sensors to scan for surface markers. In such an example, the robotic system may continuously scan for surface markers, or may scan for surface markers at a given interval, such as every 5 seconds or every 10 seconds, as examples.

The one or more sensors may be used to detect a surface marker at a first location in the environment. In one implementation, the surface marker may be positioned on an object in the environment of the robotic system. The surface marker may take a variety of forms. For example, the surface marker may include an infrared (IR) reflective sticker. Such an IR reflective sticker may comprise a clear film that may be positioned on an object in the environment of the robotic system. In another implementation, the surface marker may include one or more of a radio frequency identification (RFID) tag, an IR light-emitting diode (LED), a matrix barcode, or a magnet. In each such implementation, the one or more sensors may be configured to detect the RFID tag, the IR LED, the matrix barcode, or the magnet.

In another implementation, the surface marker may include a chemical that has been sprayed on the object in the environment of the robotic system. In such an example, the one or more sensors may include a chemical sensor configured to detect the presence of the chemical on the object. In one particular example, the chemical sensor may be sensitive to alcohol and/or ethanol, and the surface marker may include alcohol and/or ethanol on the object such that the surface marker is detectable by the chemical sensor. In another example, the chemical sensor may be sensitive to one or more chemicals present in a typical cleaning solution, such as alcohol and/or ethanol. In such an example, the chemical sensor may be used to detect a given chemical on a given surface to make sure you are not cleaning that surface if it has already been cleaned by the robotic system.

In yet another implementation, the surface marker may include a speaker that emits a sound outside of the human hearing range. For example, the speaker may be configured to emit sounds having a frequency greater than about 20 kHz. In such an example, the one or more sensors may include a microphone configured to detect the sound emitted from the speaker.

In various implementations as described above, the surface marker may be invisible to the human eye. As such, a plurality of surface markers may be positioned on various objects in the environment of the robotic system, and a human interacting in the environment would not see or be distracted by the plurality of surface markers. However, a robotic system may use the plurality of surface markers to navigate and interact with the objects in the environment, as discussed in additional detail below.

At block 306, the method 300 includes determining that the detected surface marker indicates the presence of an object having a first surface attribute at the first location. The first surface attribute may be one of a plurality of predefined surface attributes. The plurality of predefined surface attributes may be stored in data storage at the robotic system, or the robotic system may be in communication with a computing device that stores the predefined surface attributes. The plurality of surface markers in the environment of the robotic system may be unique, such that a given surface marker is stored in a database with a corresponding surface attribute. As such, in one example, when the robotic system detects a given surface marker on an object, the robotic system retrieves from its data storage a corresponding surface attribute of the object that is associated with the given surface marker. In another example, when the robotic system detects a given surface marker on an object, the robotic system communicates with a computing device to retrieve a corresponding surface attribute of the object that is associated with the given surface marker. Other examples are possible as well.

As discussed above, the surface marker may be positioned on the object such that detecting the surface marker indicates the presence of the object. In one implementation, the first surface attribute includes an indication of a material of the object. For example, the surface marker may be positioned on a mirror, and the first surface attribute may include an indication that the object on which the surface marker is placed is a mirror. In another implementation, the first surface attribute includes an indication of a category of the object. For example, such categories may include "objects to clean," "objects to move," "objects to avoid," "navigation assistance objects," or "objects for further evaluation," as examples. As such, the first surface attribute places the object in a given category based on the first surface attribute, and then may subsequently perform one or more tasks based on the given category, as discussed in additional detail below.

In one example, a single surface marker may define multiple surface attributes. For example, the surface marker may indicate the presence of an object having both a first surface attribute and a second surface attribute at the first location. In such an example, the object may be a door, for example. The first surface attribute may define the door as an object to clean, while the second surface attribute may define the door as a navigation assistance object through which the robotic system is allowed to open and pass through.

In another example, the more than one surface marker may be positioned on a single object. For example, a first surface marker may be detected by the one or more sensors of the robotic system to indicate the presence of an object having a first surface attribute, while a second surface marker may be detected by the one or more sensors of the robotic system to indicate that the object has a second surface attribute. More than two surface markers on a single object are possible as well.

At block 308, the method 300 includes, in response to determining that the surface marker indicates the object having the first surface attribute, determining one or more tasks that correspond to the first surface attribute. The one or more tasks may take a variety of forms. In one implementation, the first surface attribute includes an indication of a material of the object, and the one or more tasks may be determined based on the material of the object. For example, if the material is a wood floor, the one or more tasks may include cleaning the wood floor based on one or more cleaning parameters. Such cleaning parameters may be determined based on the first surface attribute. For example, the one or more cleaning parameters may include a particular tool with which to clean the object, a particular cleaning solution to use to clean the object, a force to use when cleaning the object, and/or a frequency of cleaning the object. As a particular example, in response to a determination that the material of the object is a wood floor, the one or more cleaning parameters may indicate that the robotic system should use a mop with a liquid disinfectant to clean the wood floors once every week. As such, the robotic system may detect surface markers on various objects in an environment such as a carpet floor, a countertop, cabinets, windows, mirrors, concrete, furniture, etc., and clean each such object using different cleaning parameters based on their predefined surface attributes.

In one example, the robotic system may include built in reservoirs of various cleaning solutions and/or built in tools to perform the cleaning. In such an example, the robotic system may use a given cleaning solution and/or a given tool based on the cleaning parameters for the given task. In another implementation, the robotic system may go to location where cleaning supplies and/or tools are stored, and select the appropriate cleaning solution and/or tool based on the determined cleaning parameters. In such an example, the one or more tasks may include (i) moving to the location where the cleaning supplies are stored, (ii) selecting the appropriate cleaning solution and/or tool, (iii) moving back to the location of the object, and (iv) cleaning the object using the selected cleaning solution and/or tool.

In another implementation, the first surface attribute includes an indication of a category of the object, and the one or more tasks may be determined based on the category. For example, as described above, such categories may include "objects to clean," "objects to move," "objects to avoid," "navigation assistance objects," or "objects for further evaluation," as examples.

If the first surface attribute includes an indication that the object is an "object to clean," the one or more tasks may include any of the cleaning tasks described above, among any other cleaning tasks.

If the first surface attribute includes an indication that the object is an "object to move," then the one or more tasks may include (i) picking up the object from the first location, (ii) moving the object to a second location, and (iii) placing the object in the second location. For example, the object may be a child's toy. In such an example, the second location may be a toy bin to hold the child's toy, and the one or more tasks involve the robotic system placing the child's toy in the toy bin.

If the first surface attribute includes an indication that the object is an "object to avoid," then the one or more tasks may include avoiding the object. For example, the surface marker may be positioned on a door through which the robotic system should not enter, or an electronic device that the robotic system should not touch, or a mirror or glass that the robotic system should avoid. In another example, the surface marker may be positioned on a collar of a pet or a baby seat that the robotic system should avoid. In each situation described above, the robotic system detects the surface marker on the given object and avoids the given object while operating in the environment. Other examples are possible as well.

If the first surface attribute includes an indication that the object is a "navigation assistance object," then the one or more tasks may include moving towards the navigation assistance object. For example, the surface marker may be positioned on a door, and the first surface attribute may define the door as a navigation assistance object through which the robotic system should open and pass through. In another example, the surface marker may be positioned on a cabinet door or a refrigerator door, and the first surface attribute may define the cabinet door or the refrigerator door as a navigation assistance object that the robotic system should open. Other examples are possible as well.

If the first surface attribute includes an indication that the object is an "object for further evaluation," then the one or more tasks may take a variety of forms. In one example, the one or more tasks may include (i) picking up the object at the first location, (ii) determining a weight of the object, (iii) comparing the determined weight of the object to a threshold weight, and (iv) in response to a determination that the comparison indicates that the determined weight is less than the threshold weight, transmitting a message indicating that a substance within the object is threshold low. In one example, the message may be an email or text message directed to an owner of the robotic system that the particular product associated with the object is threshold low, so the owner should reorder the product. In another example, the one or more tasks may further include the robotic system providing instructions to purchase the product corresponding to the object. In particular examples, the robotic system may weigh cleaning solutions, food items, among other products, and automatically reorder those items if the weight of a given item is less than a threshold value.

In another implementation, the categories defined by the first attribute can overlap. For example, the object may be a dish, and the one or more tasks may include cleaning the dish ("object to clean") and then moving the dish to a second location such as a cabinet ("object to move").

At block 310, the method 300 includes causing the robotic system to perform the one or more tasks with respect to the object. The one or more tasks may include any of the one or more tasks described above, among any other tasks capable of being performed by a given robotic system.

In another implementation, the object comprises a first object, and the surface marker comprises a first surface marker. In such an implementation, the method 300 may further include detecting a contact between the robotic system and a second object in the environment, and in response to the detected contact, placing a second surface marker on the second object. In such an example, the second surface marker may include instructions for the robotic system to avoid the second object. Such an implementation may be useful in a situation where a given object is difficult for the robotic system to detect. In such an example, the robotic system may store a supply of surface markers, and may use various appendages or attachments, such as fingers, grippers, etc. to apply the surface markers to the second object. In another example, the robotic system may only apply the surface marker to the second object after it detects an unexpected contact between the robotic system and the second object a threshold number of times, such as two, three, or five times, as examples.

IV. EXAMPLE COMPUTER-READABLE MEDIUM

Figure 4:
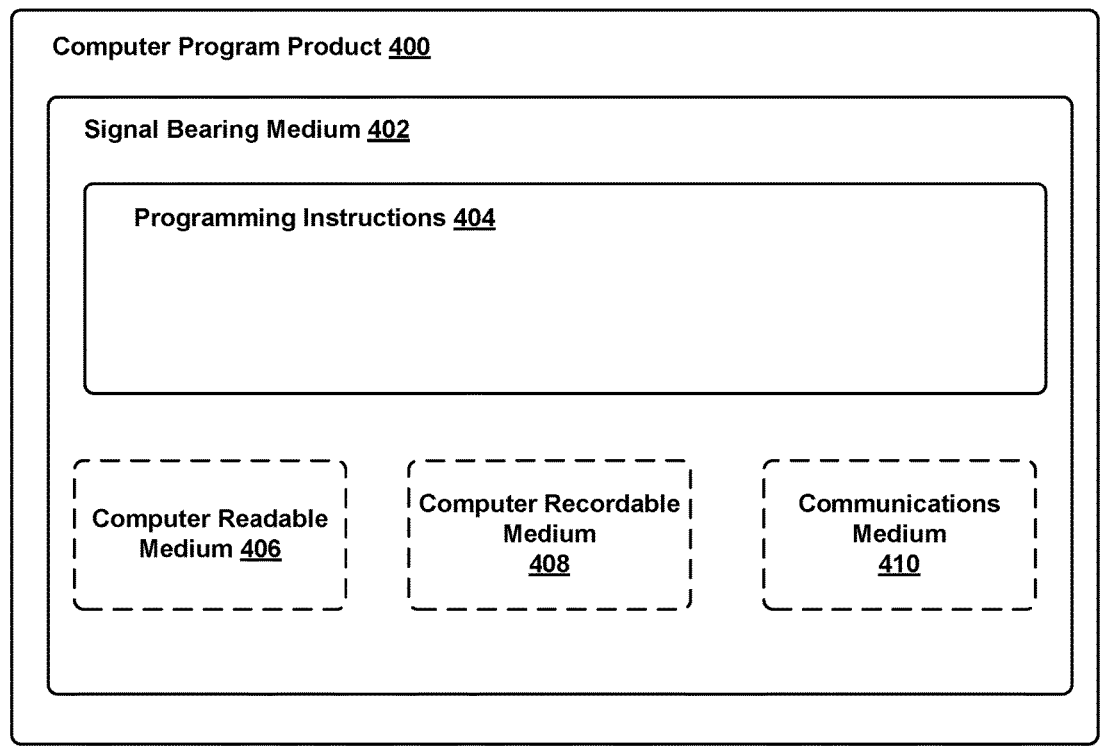
FIG. 4 is an example computer-readable medium, according to an example implementation.

FIG. 4 depicts an example computer-readable medium configured according to an example implementation. In example implementations, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some implementations, the disclosed techniques (e.g., method 300, etc.) may be implemented by computer program instructions encoded on a computer-readable storage media in a machine-readable format, or on other media or articles of manufacture (e.g., program instructions 106 of the robotic system 100). FIG. 4 is a schematic illustrating a conceptual partial view of an example computer program product that includes a computer program for executing a computer process on a computing device, arranged according to at least some implementations disclosed herein.

In one implementation, the example computer program product 400 is provided using a signal bearing medium 402. The signal bearing medium 402 may include one or more programming instructions 404 that, when executed by one or more processors may provide functionality or portions of the functionality described above with respect to FIGS. 1-3. In some examples, the signal bearing medium 402 may be a computer-readable medium 406, such as, but not limited to, a hard disk drive, a Compact Disc (CD), a Digital Video Disk (DVD), a digital tape, memory, etc. In some implementations, the signal bearing medium 402 may be a computer recordable medium 408, such as, but not limited to, memory, read/write (R/W) CDs, R/W DVDs, etc. In some implementations, the signal bearing medium 402 may be a communication medium 410 (e.g., a fiber optic cable, a waveguide, a wired communications link, etc.). Thus, for example, the signal bearing medium 402 may be conveyed by a wireless form of the communications medium 410.

The one or more programming instructions 404 may be, for example, computer executable and/or logic implemented instructions. In some examples, a computing device may be configured to provide various operations, functions, or actions in response to the programming instructions 404 conveyed to the computing device by one or more of the computer-readable medium 406, the computer recordable medium 408, and/or the communications medium 410.

The computer-readable medium 406 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

V. CONCLUSION

Arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Further, the terminology used herein is for the purpose of describing particular implementations only, and is not intended to be limiting.

We claim:

1. A method comprising:
   operating a robotic system in an environment;
   detecting, using one or more sensors of the robotic system, a surface marker positioned on an object at a first location in the environment;
   determining that the detected surface marker indicates a first surface attribute of the object, wherein the first surface attribute is one of a plurality of predefined surface attributes, and wherein the first surface attribute comprises an indication of a material of the object;
   in response to determining that the surface marker indicates the first surface attribute, determining one or more tasks that correspond to the first surface attribute, wherein at least one of the one or more tasks comprises manipulating the object using one or more parameters, and wherein the one or more parameters are determined based on the material of the object; and
   causing the robotic system to perform the one or more tasks with respect to the object.

2. The method of claim 1, wherein the surface marker is invisible to a human eye.

3. The method of claim 1, wherein the surface marker is a speaker that emits a sound outside of a human hearing range.

4. The method of claim 1, wherein manipulating the object comprises avoiding the object.

5. The method of claim 1, wherein manipulating the object comprises:
   picking up the object from the first location;
   moving the object to a second location; and
   placing the object in the second location.

6. The method of claim 1, wherein the object comprises a first object and the surface marker comprises a first surface marker, the method further comprising:
   detecting a contact between the robotic system and a second object in the environment; and
   in response to the detected contact, placing a second surface marker on the second object, wherein the second surface marker includes instructions for the robotic system to avoid the second object.

7. The method of claim 1, wherein manipulating the object comprises cleaning the object.

8. The method of claim 7, wherein the one or more parameters comprises one or more cleaning parameters, and wherein the one or more cleaning parameters are determined based on the material of the object.

9. The method of claim 1, wherein manipulating the object comprises:
   picking up the object at the first location;
   determining a weight of the object;
   comparing the determined weight of the object to a threshold weight; and
   in response to a determination that the comparison indicates that the determined weight is less than the threshold weight, transmitting a message indicating that a substance within the object is threshold low.

10. The method of claim 9, further comprising:
    providing instructions to purchase a product corresponding to the object.

11. A robotic system comprising:
    one or more processors;
    one or more sensors; and
    data storage including program instructions stored thereon that when executed by the one or more processors of the robotic system while operating in an environment, cause the robotic system to perform operations comprising:
       detecting, using the one or more sensors, a surface marker positioned on an object at a first location in the environment;
       determining that the detected surface marker indicates a first surface attribute of the object, wherein the first surface attribute is one of a plurality of predefined surface attributes, and wherein the first surface attribute comprises a material of the object;
       in response to determining that the surface marker indicates the first surface attribute, determining one or more tasks that correspond to the first surface attribute, wherein at least one of the one or more tasks comprises manipulating the object using one or more parameters, and wherein the one or more parameters are determined based on the material of the object; and
       causing the robotic system to perform the one or more tasks with respect to the object.

12. The robotic system of claim 11, wherein manipulating the object comprises avoiding the object.

13. The robotic system of claim 11, wherein manipulating the object comprises:
    picking up the object from the first location;
    moving the object to a second location; and
    placing the object in the second location.

14. The robotic system of claim 11, wherein the object comprises a first object and the surface marker comprises a first surface marker, and wherein the operations further comprise:
    detecting a contact between the robotic system and a second object in the environment; and
    in response to the detected contact, placing a second surface marker on the second object, wherein the second surface marker includes instructions for the robotic system to avoid the second object.

15. The robotic system of claim 11, wherein manipulating the object comprises cleaning the object using one or more cleaning parameters, and wherein the one or more cleaning parameters are determined based on the material of the object.

16. A non-transitory computer-readable medium having stored thereon instructions, that when executed by one or more processors, cause a robotic system to perform operations comprising:
    operating a robotic system in an environment;
    detecting, using one or more sensors of the robotic system, a surface marker positioned on an object at a first location in the environment;
    determining that the detected surface marker indicates a first surface attribute of the object, wherein the first surface attribute is one of a plurality of predefined surface attributes, and wherein the first surface attribute comprises a material of the object;
    in response to determining that the surface marker indicates the first surface attribute, determining one or more tasks that correspond to the first surface attribute, wherein at least one of the one or more tasks comprises manipulating the object using one or more parameters, and wherein the one or more parameters are determined based on the material of the object; and
    causing the robotic system to perform the one or more tasks with respect to the object.

17. The non-transitory computer-readable medium of claim 16, wherein manipulating the object comprises avoiding the object.

18. The non-transitory computer-readable medium of claim 16, wherein the object comprises a first object and the surface marker comprises a first surface marker, and wherein the operations further comprise:
    detecting a contact between the robotic system and a second object in the environment; and
    in response to the detected contact, placing a second surface marker on the second object, wherein the second surface marker includes instructions for the robotic system to avoid the second object.

19. The non-transitory computer-readable medium of claim 16, wherein manipulating the object comprises:
    picking up the object at the first location;
    determining a weight of the object;
    comparing the determined weight of the object to a threshold weight;
    in response to a determination that the comparison indicates that the determined weight is less than the threshold weight, transmitting a message indicating that a substance within the object is threshold low.

20. The method of claim 1, wherein the surface marker is located above a floor surface in the environment.

* * * * *